United States Patent
Momosaki et al.

(10) Patent No.: US 7,467,088 B2
(45) Date of Patent: Dec. 16, 2008

(54) CLOSED CAPTION CONTROL APPARATUS AND METHOD THEREFOR

(75) Inventors: Kohei Momosaki, Kawasaki (JP); Koichi Yamamoto, Kawasaki (JP); Yasuyuki Masai, Yokohama (JP); Makoto Yajima, Tachikawa (JP); Kazuhiko Abe, Yokohama (JP); Munehiko Sasajima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 674 days.

(21) Appl. No.: 10/917,351

(22) Filed: Aug. 13, 2004

(65) Prior Publication Data

US 2005/0038661 A1 Feb. 17, 2005

(30) Foreign Application Priority Data

Aug. 15, 2003 (JP) .............................. 2003-207621

(51) Int. Cl.
*G10L 11/00* (2006.01)
*G10L 21/00* (2006.01)
*H04N 5/445* (2006.01)

(52) U.S. Cl. .................. 704/270; 704/233; 348/563
(58) Field of Classification Search ................. None
See application file for complete search history.

(56) References Cited

U.S. PATENT DOCUMENTS 5,327,176 A * 7/1994 Forler et al. ................. 348/564
6,785,649 B1 * 8/2004 Hoory et al. ................. 704/235
2002/0154246 A1 * 10/2002 Hawkins ..................... 348/465
2006/0044479 A1 * 3/2006 Heo ............................ 348/738
2006/0114757 A1 * 6/2006 Theimer et al. .......... 369/30.01

FOREIGN PATENT DOCUMENTS

| JP | 5-113797 | 5/1993 |
|----|----------|--------|
| JP | 5-289691 | 11/1993 |
| JP | 7-123376 | 5/1995 |
| JP | 7-226907 | 8/1995 |
| JP | 7-306695 | 11/1995 |
| JP | 9-6529 | 1/1997 |
| JP | 2003-78884 | 3/2003 |
| JP | 2005-64592 | 3/2005 |

* cited by examiner

*Primary Examiner*—David R Hudspeth
*Assistant Examiner*—Brian L Albertalli
(74) *Attorney, Agent, or Firm*—Oblon, Spivak, McClelland, Maier & Neustadt, P.C.

(57) ABSTRACT

A closed caption display controller to control a display mode of a closed caption corresponding to a speech of an audio signal, the controller comprises an analysis unit to analyze the speech on a speech quality, an examination unit configured to examine a speech listening level according to a given rule based on an analysis result of the analysis unit, and a determination unit to determine a display mode according to an examination result of the examination unit.

9 Claims, 12 Drawing Sheets

| Rule | Background sound | Ambient noise | Speed of speech |
|------|------------------|---------------|-----------------|
| 1 | △ | | |
| 2 | ▲ | ※ | |
| 3 | | △ | |
| 4 | | | ◇ |

△ : Display closed caption at not less than a fixed reference value

▲ : Display closed caption at not less than a variable reference value due to ※

◇ : Display closed-caption outside a fixed reference range

| Rule | Background sound | Ambient noise | Playback sound volume | Speed of speech | Playback speed |
|---|---|---|---|---|---|
| 1 | △ | | | | |
| 2 | ▲ | ※ | | | |
| 3 | | △ | | | |
| 4 | | | | ◇ | |
| 5 | ▲ | | ※ | | |
| 6 | ▲ | ※ | ※ | | |
| 7 | ※ | | ▼ | | |
| 8 | ※ | ※ | ▼ | | |
| 9 | | | | ◆ | ※ |
| 10 | | | | ※ | ◆ |
| 11 | | | | | ◇ |
| 12 | | | | | reverse |
| 13 | | | | | pause |
| 14 | | | ▽ | | |
| 15 | | ※ | ▼ | | |

△ : Display closed caption at not less than a fixed reference value
▽ : Display closed caption at less than a fixed reference value
◇ : Display closed outside a fixed reference range
▲ : Display closed caption at not less than a variable reference value due to ※
▼ : Display closed caption at less than a variable reference value due to ※
◆ : Display closed caption outside a variable reference range due to ※

FIG. 6

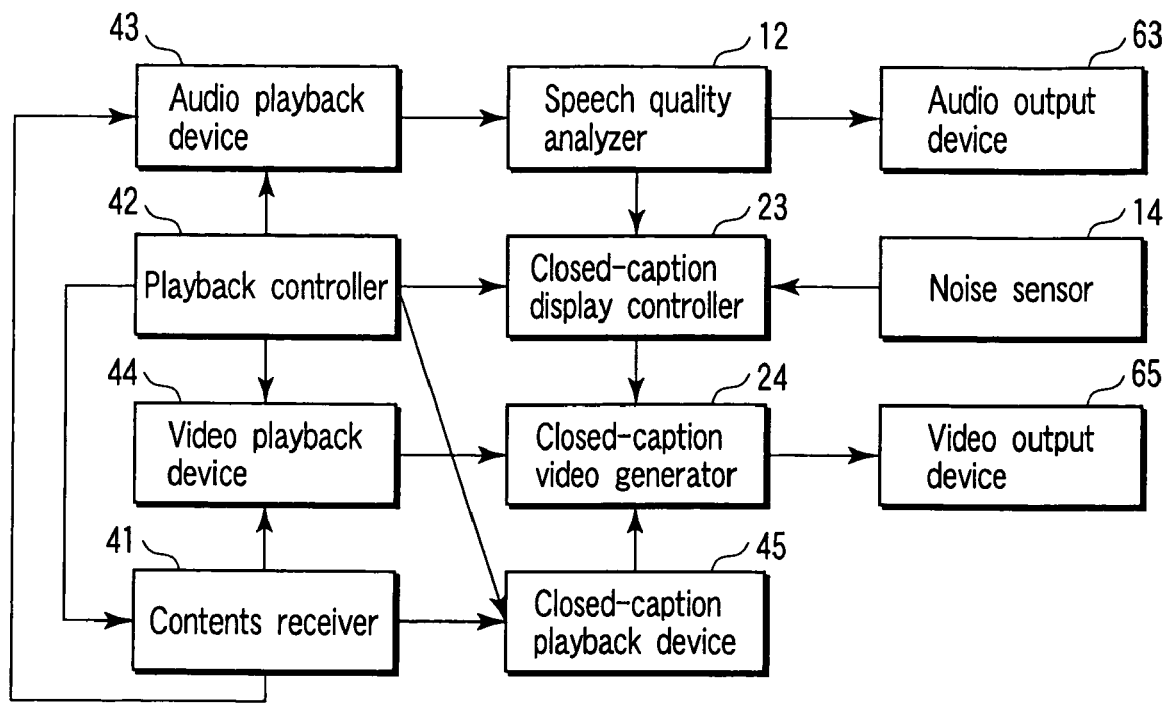
F I G. 11
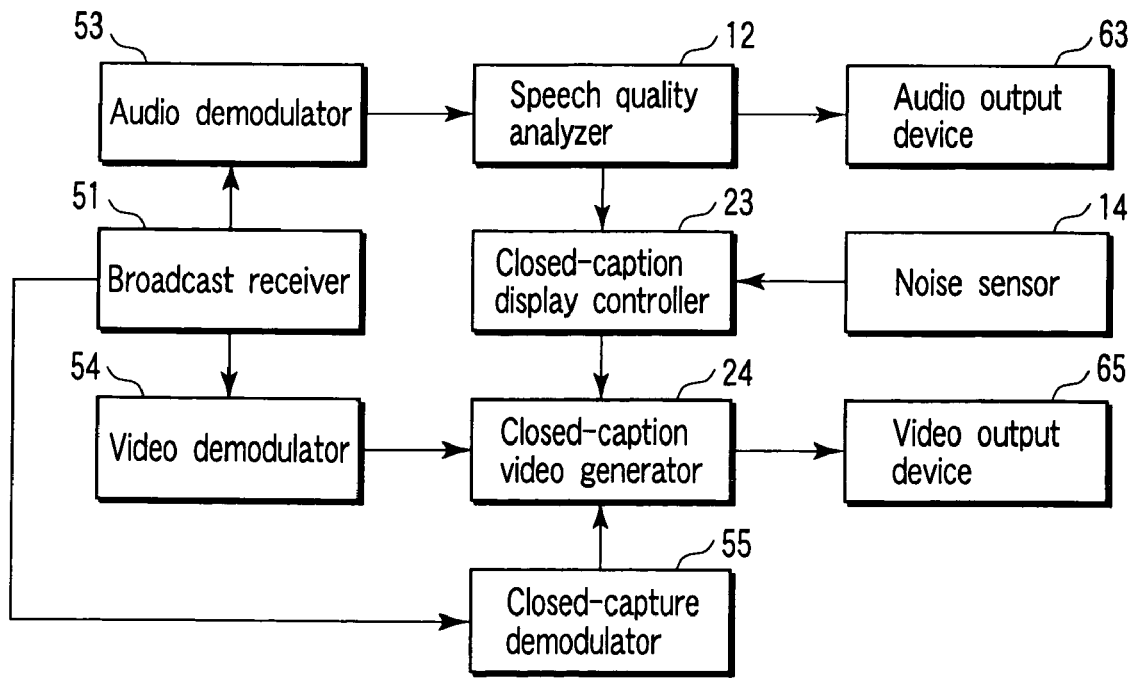
F I G. 12

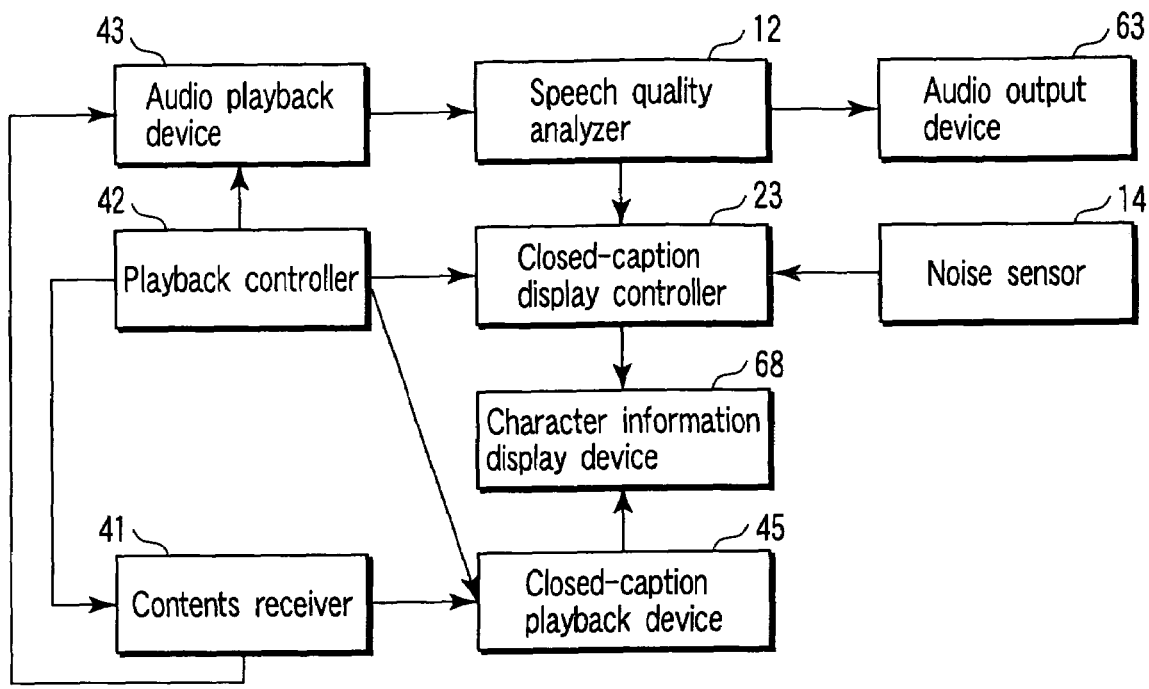
F I G. 14
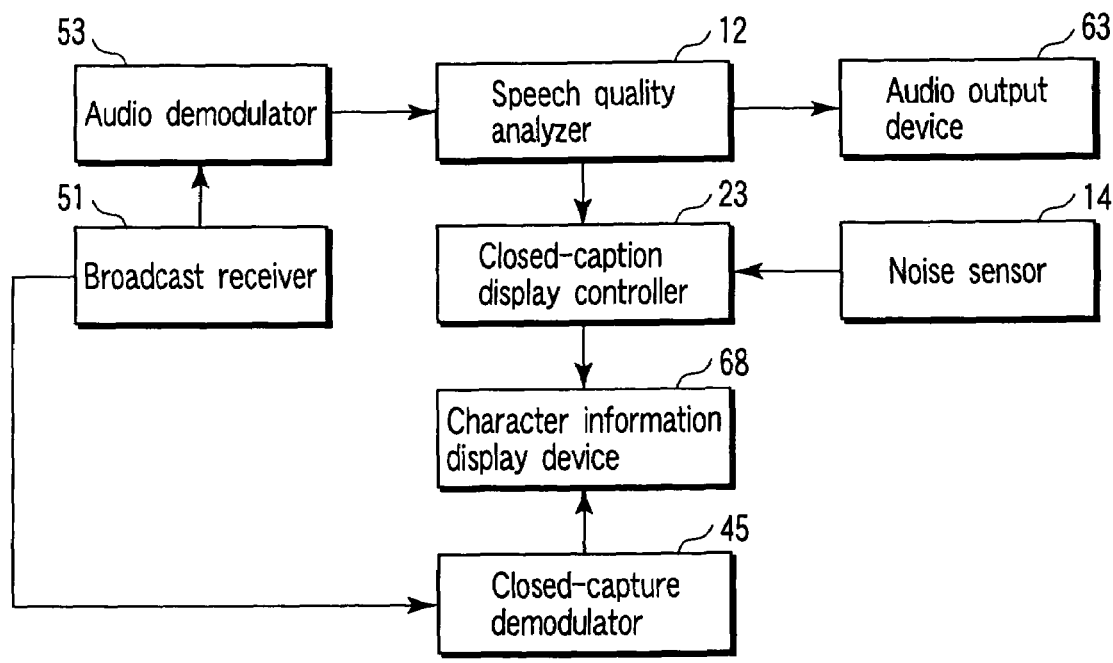
F I G. 15

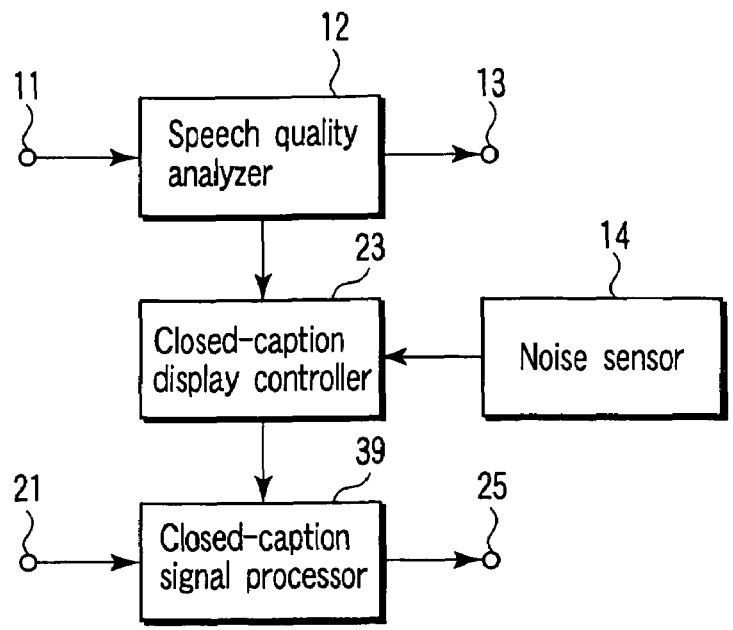
F I G. 16
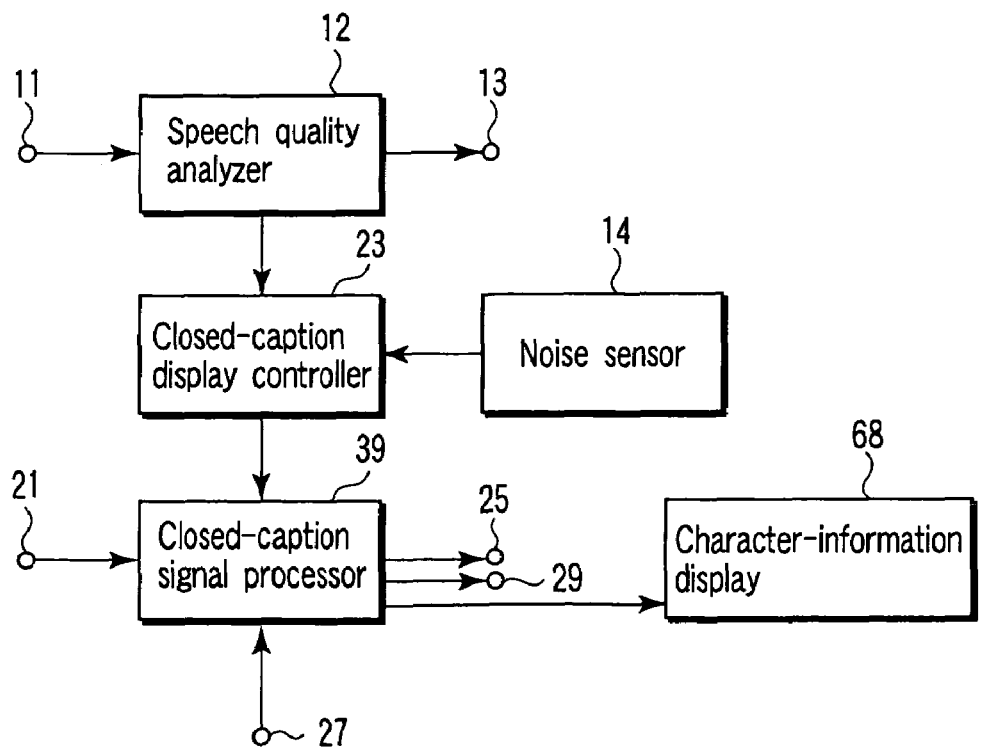
F I G. 17

CLOSED CAPTION CONTROL APPARATUS AND METHOD THEREFOR

CROSS-REFERENCE TO RELATED APPLICATIONS

This application is based upon and claims the benefit of priority from prior Japanese Patent Application No. 2003-207621, filed Aug. 15, 2003, the entire contents of which are incorporated herein by reference.

BACKGROUND OF THE INVENTION

1. Field of the Invention

The present invention relates to a closed caption control apparatus which is used by being built into or connected to a video playback apparatus, an audio playback apparatus, a video record-playback apparatus, or an audio record-playback apparatus, and which controls displaying of closed caption and other character information; and a method therefor.

2. Description of the Related Art

In playing-back video contents of television broadcasting or a DVD (Digital Versatile Disc) or the like, closed caption information for complementing audio information output along with video is provided. In a case of the television broadcasting, closed caption information is formed from teletex signals embedded in video signals, and transmitted by using identification signals (VBI signals) inserted into a vertical blanking interval. On a DVD or the like, multi-lingual closed caption information can be recorded along with video and audio. Further, in a case of digital high-vision broadcasting, closed caption information can be transmitted as sub video information.

It can be thought that the utilization of closed caption information is effective in a case where to hear the speech corresponding to an image is hard for not only a hearing impairment person or a defective hearing person, but also a person with normal hearing. For example, there are cases in which a background noise or music (BGM) mixed in a speech interferes hearing of the speech contents. Further, it goes without saying the case where a speed of speech to be heard is fast, and in a case where the speed of speech is extremely slow as well, it is hard even for the person with normal hearing to exactly listen the speech.

A technique in which a mode for displaying closed caption information corresponding to speech contents or the like is controlled in accordance with a difficulty in listening of the speech contents has been not realized yet in a conventional video playback apparatus or information display device.

On the other hand, several techniques of analyzing audio information have been known. For example, with regard to a determination on background noise, a method for estimating an SN ratio of input audio which is aimed for suppressing noise (for example, refer to Jpn. Pat. Appln. KOKAI Publication No. 7-306695) is well known. Further, with regard to a determination on musical sound, a method based on an auto-correlation coefficient of sound data (for example, refer to Jpn. Pat. Appln. KOKAI Publication No. 5-113797) is well known. Moreover, with regard to an estimation of a speed of speech, a method based on a dynamic features of a sound signal (for example, refer to Jpn. Pat. Appln. KOKAI Publication No. 5-289691) is well known.

An object of the present invention is to provide a closed caption control apparatus to display complementary closed caption information such that the contents of speech can be appropriately and exactly delivered to a viewer even in a situation in which it is hard to hear a speech in audio output, or control a mode for displaying the closed caption information, and a method therefor.

BRIEF SUMMARY OF THE INVENTION

An aspect of the present invention provides a closed caption display controller to control a display mode of a closed caption corresponding to a speech of an audio signal, the controller comprising: a closed caption generator to generate a closed caption image representing the closed caption; an analysis unit configured to analyze the speech on a speech quality; an examination unit configured to examine a speech listening level of the speech according to a given rule based on an analysis result of the analysis unit; and a determination unit configured to determine a display mode of the closed caption image according to an examination result of the examination unit.

Another aspect of the present invention provides a closed caption display control method of controlling a display mode of a closed caption mixed in an audio signal and corresponding to a speech of the audio signal, the method comprising: analyzing the speech on a speech quality; examining a speech listening level according to a given rule based on an analysis result; and determining a display mode according to an examination result.

BRIEF DESCRIPTION OF THE SEVERAL VIEWS OF THE DRAWING

FIG. 6 is a diagram showing one example of a rule set provided in a closed caption display controller of the second embodiment;

FIG. 11 is a block diagram showing a schematic configuration of a contents player according to a fifth embodiment of the present invention;

FIG. 12 is a block diagram showing a schematic configuration of a video playback apparatus according to a sixth embodiment of the present invention;

FIG. 14 is a block diagram showing a schematic configuration of an audio playback apparatus according to an eighth embodiment of the present invention;

FIG. 15 is a block diagram showing a schematic configuration of an audio playback apparatus according to a ninth embodiment of the present invention;

FIG. 16 is a block diagram showing another schematic configuration of the closed caption control apparatus according to the first embodiment of the present invention;

FIG. 17 is a block diagram showing yet another schematic configuration of the closed caption control apparatus according to the first embodiment of the present invention;

DETAILED DESCRIPTION OF THE INVENTION

There will now be described embodiments of the present invention with reference to the drawings. Note that, in the description of the embodiments, "speech signal" and "speech data" mean general signal and data expressing arbitrary sound including background sound (background noise, background musical sound, and the like), which are not limited to human voice. Further, a speech which is vocalized as linguistic means from a human being or a speech synthesizer is called "speech". Both of speech signal and speech data express sound in which speech and background sound are mixed. Note that "speech signal" and "speech data" may be respectively read as "audio signal" and "audio data". Further, "image signal" and "image data" may be respectively read as "video signal" and "video data".

Further, "closed caption information" is, in principle, character information, such as the contents of words or lyrics, which is intended to be played back and displayed so as to be mixed with a speech signal or video signal by a producer. These speech signal (audio data), video signal (video data), and closed caption information have an indivisible relationship with respect to the contents which are respectively expressed. In principle, these three are intended to be played back so as to be synchronized with each other by a producer. This is the same as in the other embodiments which will be described later.

FIRST EMBODIMENT

A closed caption control apparatus according to a first embodiment of the present invention is used by being connected to a video playback apparatus which receives and plays-back broadcasted video, audio, and closed caption information. As a concrete example of the video playback apparatus, in the first embodiment, this is, for example, a television receiver. The closed caption information is transmitted by being embedded in a video signal, or is transmitted as sub video and received by the television receiver.

Figures 1, 2:
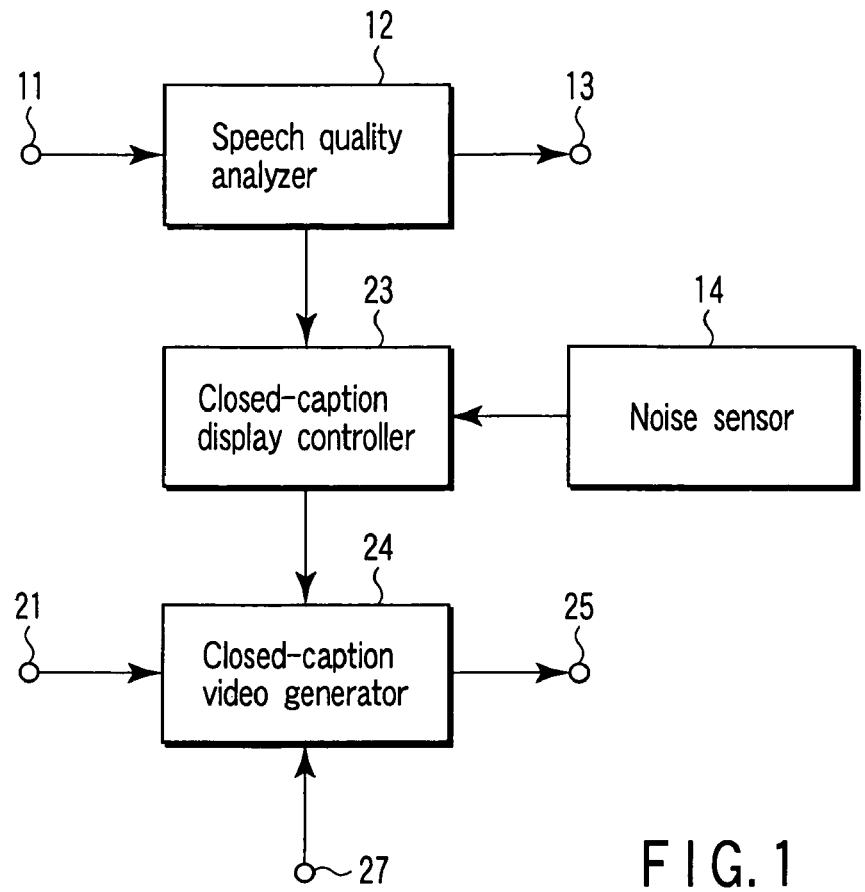
FIG. 1 is a block diagram showing a schematic configuration of a closed caption control apparatus according to a first embodiment of the present invention.
FIG. 2 is a chart showing an example of a rule set provided in a closed caption display controller of the first embodiment.

FIG. 1 is a block diagram showing a schematic configuration of the closed caption control apparatus according to the first embodiment. This apparatus has an audio input terminal 11, a video input terminal 21, and a character information input terminal 27. These input terminals 11, 21, and 27 are respectively connected to an audio output terminal, a video output terminal, and a character information output terminal to which the television receiver corresponds, via cables or the like. When the television receiver receives broadcast wave via an antenna or the like, the television receiver demodulates the received wave, and outputs a speech signal, a video signal, and closed caption information respectively from the above-described output terminals.

The closed caption control apparatus of the present embodiment has, as the disclosed components relating to the main portion thereof, a speech quality analyzer 12 to analyze a speech signal inputted to the audio input terminal 11, a noise sensor 14 having a microphone, to sense an ambient noise level, a closed caption display controller 23 to control the display of closed caption information in accordance with rules, and a closed-caption video generator 24. The closed-caption video generator 24 has character font data, and inputs closed caption information from the character information input terminal 27 and generates a picture signal of closed caption characters by using the character font data. The generator 24 then generates a closed-caption video signal by synchronizing the image signal of closed caption characters with the image signal inputted from the video input terminal 21. The closed caption control apparatus according to the present invention can be realized by, for example, computer software. In this case, a program for closed caption control executes the procedure for causing a computer to function as a closed caption control apparatus.

The closed caption control apparatus of the present embodiment has, as the disclosed components relating to the outputs of closed-caption video and audio, an audio output terminal 13 for outputting the speech signal inputted to the speech quality analyzer 12, and a video output terminal 25 for outputting the closed-caption video signal generated by the closed-caption video generator 24 so as to be synchronized with the speech signal. Note that, although the audio output terminal 13 is not necessarily required because audio can be played-back from the television receiver, for example, a headphone for monitoring or another audio playback machine can be connected to the audio output terminal 13. Further, the audio output terminal 13 may be provided so as to be diverged from the audio input terminal 11 at a position before being input to the speech quality analyzer 12. The output from the video output terminal 25 can be connected to, for example, another display device for monitoring. Further, the output from the video output terminal 25 can be input so as to be returned to the video input terminal of the television receiver. It goes without saying that both of the outputs from the audio output terminal 13 and the video output terminal 25 may be respectively provided to the audio input terminal and the video input terminal of the another display device for monitoring or the television receiver.

Further, in place of the character information input terminal 27, the character information may be embedded in the picture signal inputted to the video input terminal 21, and the embedded character information may be extracted at the closed-caption video generator 24 and a closed-caption video signal may be generated.

Moreover, a closed caption signal processor 39 may be provided in place of the closed-caption video generator 24. In this case, the closed caption signal processor 39 is configured to be able to embed character information in the video signal output from the video output terminal 25. Only whether or not the character information is embedded in the video signal may be switched under control of the closed caption display controller 23. Alternatively, the character information of the closed caption whose control information has been processed may be embedded in the video signal again in accordance with control of the closed caption display controller 23. In this case, a display device connected to the video output terminal 25 extracts the character information embedded in the video signal, to generate the closed-caption video signal (FIG. 16).

Further, the character information may be prevented from being introduced into the video output terminal 25. Alternatively, a character information display device 68 or a character information output terminal 29 may be additionally provided (FIG. 17).

It is configured to match with input/output terminals of an apparatus to be connected to the closed caption control apparatus of the present embodiment in front and rear stages thereof.

The speech quality analyzer 12 estimates a level of background sound mixed in the input sound signal and a speed of speech in an analysis. The background sound includes background noise and background musical sound, and the level thereof can be estimated by using a method disclosed in, for example, Jpn. Pat. Appln. KOKAI Publication No. 7-306695 or 5-113797. Further, a speed of speech can be estimated by using a method disclosed in, for example, Jpn. Pat. Appln. KOKAI Publication No. 5-289691. The speech quality analyzer 12 outputs the level of the background sound and the speed of speech estimated in this way as two analyzed values for use in a speech listening level examination for a speech in the input speech signal.

The noise sensor 14 takes-in sound by a microphone provided at an audiovisual environment, and senses an ambient noise level for a viewer. The microphone is preferably disposed at a position which is hard to be affected by audio output from a speaker of the television receiver (or a speaker of another audio playback machine connected to the audio output terminal 13). At that time, it is preferable that a speech signal input from the audio input terminal 11 is referred to, and ambient sound except for the playback sound is estimated on the basis of the speech signal, which can improve noise sensing precision.

The closed caption display controller 23 has a rule set for use in a speech listening level examination for examining the difficulty in hearing a speech, and carries out the speech listening level examination on the speech in the input speech signal by applying the rule set to the analyzed values obtained by the speech quality analyzer 12 and the ambient noise level sensed by the noise sensor 14. On the basis of the result of this examination, the closed caption display controller 23 determines a mode for displaying closed caption information, and controls the closed-caption video generator 24.

As shown in FIG. 2, the rule set such that a speech listening level representing the difficulty in hearing a speech is expressed by three types of examination reference values consisting of background sound, ambient noise, and speed of speech, and includes Rule 1 to Rule 4. In the examination, it is inspected whether or not the analyzed values obtained by the speech quality analyzer 12 and the ambient noise level sensed by the noise sensor 14 meet at least one of Rule 1 to Rule 4 in comparison with the examination reference values. When those do not meet any of Rule 1 to Rule 4, the difficulty in hearing the speech is denied. In other words, it is not hard to hear the speech, and the closed caption control is not carried out. Note that closed caption is usually in a non-display state.

Rules 1 to 4 included in the rule set are interpreted as follows.

Rule 1: When a level of background sound mixed in the sound signal (including background noise and background musical sound) is not less than a fixed reference value, the closed caption is made to be in a display state.

Rule 2: A reference value variable in accordance with an ambient noise level is determined. When the level of background sound mixed in the sound signal is not less than the variable reference value, the closed caption is made to be in a display state. Rule 2 differs from Rule 1 in that the reference value is not fixed, but variable.

Rule 3: When an ambient noise level is not less than a fixed reference value, the closed caption is made to be in a display state.

Rule 4: When a speed of speech in the speech signal is outside a fixed reference range, the closed caption is made to be in a display state.

In accordance with Rules 1 and 2, when it is hard to hear a speech due to the background sound mixed in the sound signal, in accordance with Rule 3, when it is hard to hear a speech due to the ambient noise (example: when a ring tone of a telephone started to ring during the time of viewing, or the like), and in accordance with Rule 4, when it is hard to hear a speech due to the speed of speech (example: when a speed of speaking (speed of speech) of a speaker is too fast or too slow in audio sound, or the like), closed caption videos are output and displayed by being synchronized with audio in the respective cases. Accordingly, because hearing of speech is supported by the closed caption display, there is no case where the viewer (user) is interfered from understanding the spoken contents.

Note that the present embodiment can be modified as follows. For example, even when Rules 2 and 3 are not used, i.e., even when only Rules 1 and 4 relating to the background sound and the speed of speech are used, because the effect of closed caption display control can be obtained, it may be configured such that there is not provided the noise sensor 14 in view of the product cost or the like.

Further, even when only the background sound level (Rule 1) or the speed of speech (Rule 4) are used, the effect of closed caption display control can be obtained. Therefore, the speech quality analyzer 12 may be simplified to analyze only either the background sound level or the speed of speech.

It is preferable that a speech listening level representing the difficulty in hearing a speech is expressed by functions of a plurality of parameters (factors) and the functions are evaluated, and closed caption control is carried out on the basis of the evaluated results. For example, if not only background sound or the speed of speech, but also the parameters such as an extent of a low voice, an extent of less intonation, voices in an international call or a portable telephone call, an extent of loud echo, the number of speakers simultaneously speaking, a foreign language, a dialect, an accent, and the like are taken into consideration, the quality of the examination can be improved.

The parameters of the reference values and the functions in the respective rules in the rule set can be preferably set or adjusted to desired values by a user who is viewing. For example, a middle and early old aged user may set a reference range of the speed of speech to be rather low than that of a young user. Further, it can be thought that a reference value of background sound is set to be rather low in accordance with hearing ability. The present embodiment is effective for hard-of-hearing users who need for complementing information by closed caption than the users with normal hearing. It can be thought that a user who views by using a headphone or an earphone may set a reference value of the ambient noise to be higher, or may set the effect on the respective variable reference values due to the ambient noise to be smaller.

Figure 3A:
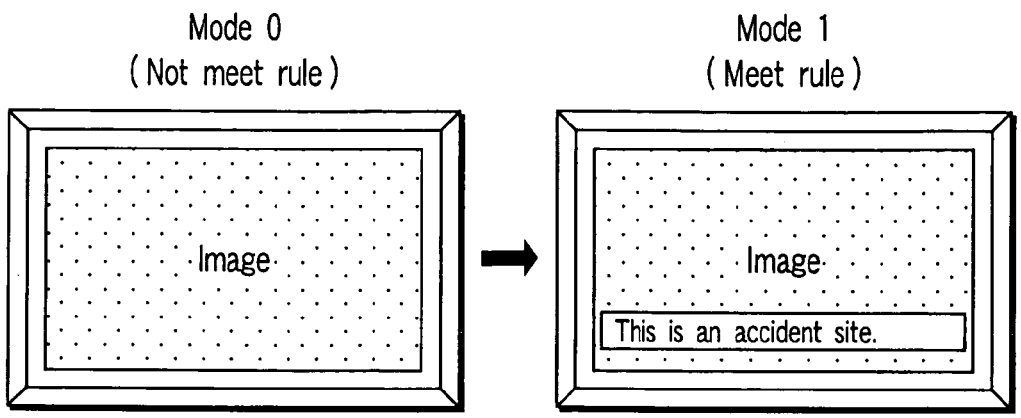
FIGS. 3A to 3D are diagrams showing examples of controlling a closed caption display in the first embodiment.
Figure 3B:
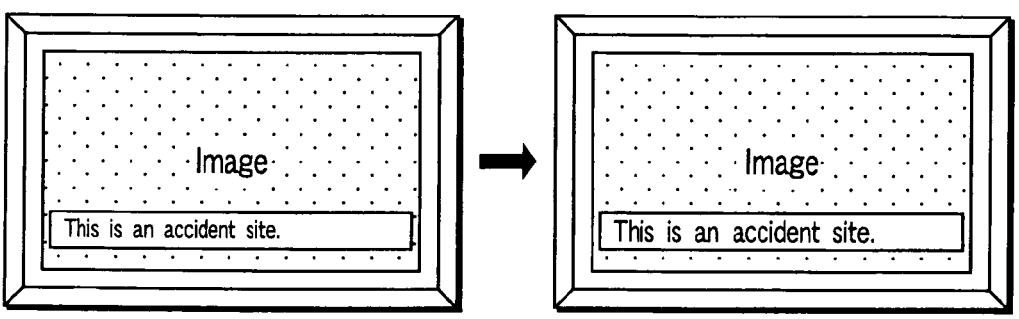
Figure 3C:
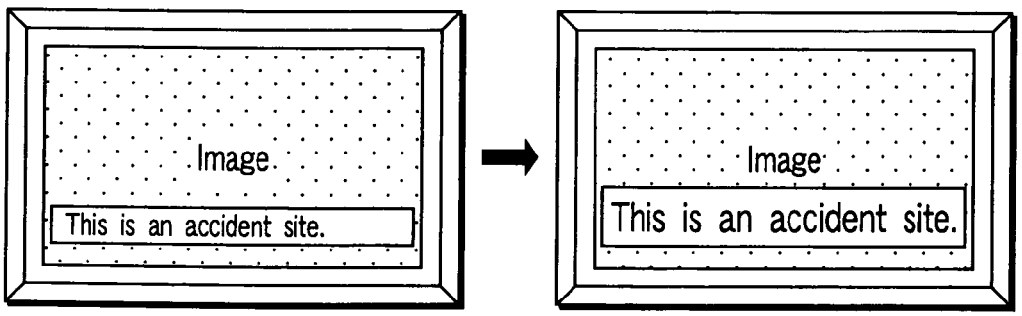
Figure 3D:
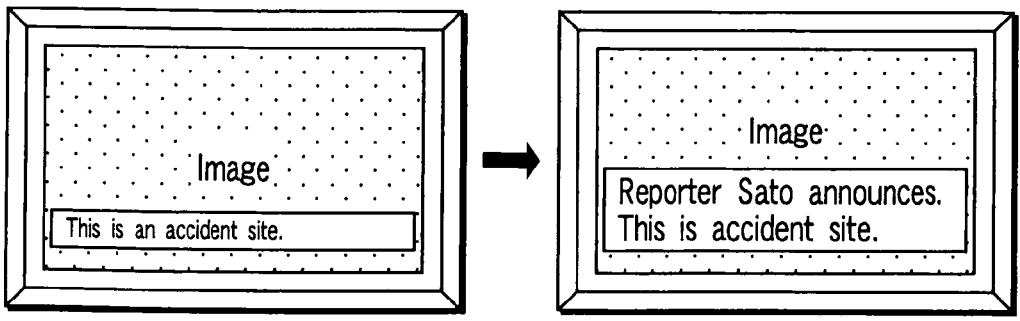

A mode for displaying closed caption information determined by the closed caption display controller 23 is not limited to only a non-display mode or a display mode as shown in FIG. 3A. For example, the closed caption is generally set to be in a display state, and the sizes of the closed caption characters at that time are set to be smaller than a standard. When the speech listening level examination result meets a rule, the closed caption characters may be varied to be a standard size (FIG. 3B). When the examination result does not meet any rule, the closed caption characters may be set to be a standard size, at the time of meeting a rule, the sizes of the closed caption characters are enlarged (FIG. 3C), and at the time of meeting a rule, the number of lines of displaying the closed caption characters may be increased (FIG. 3D).

Figure 4:
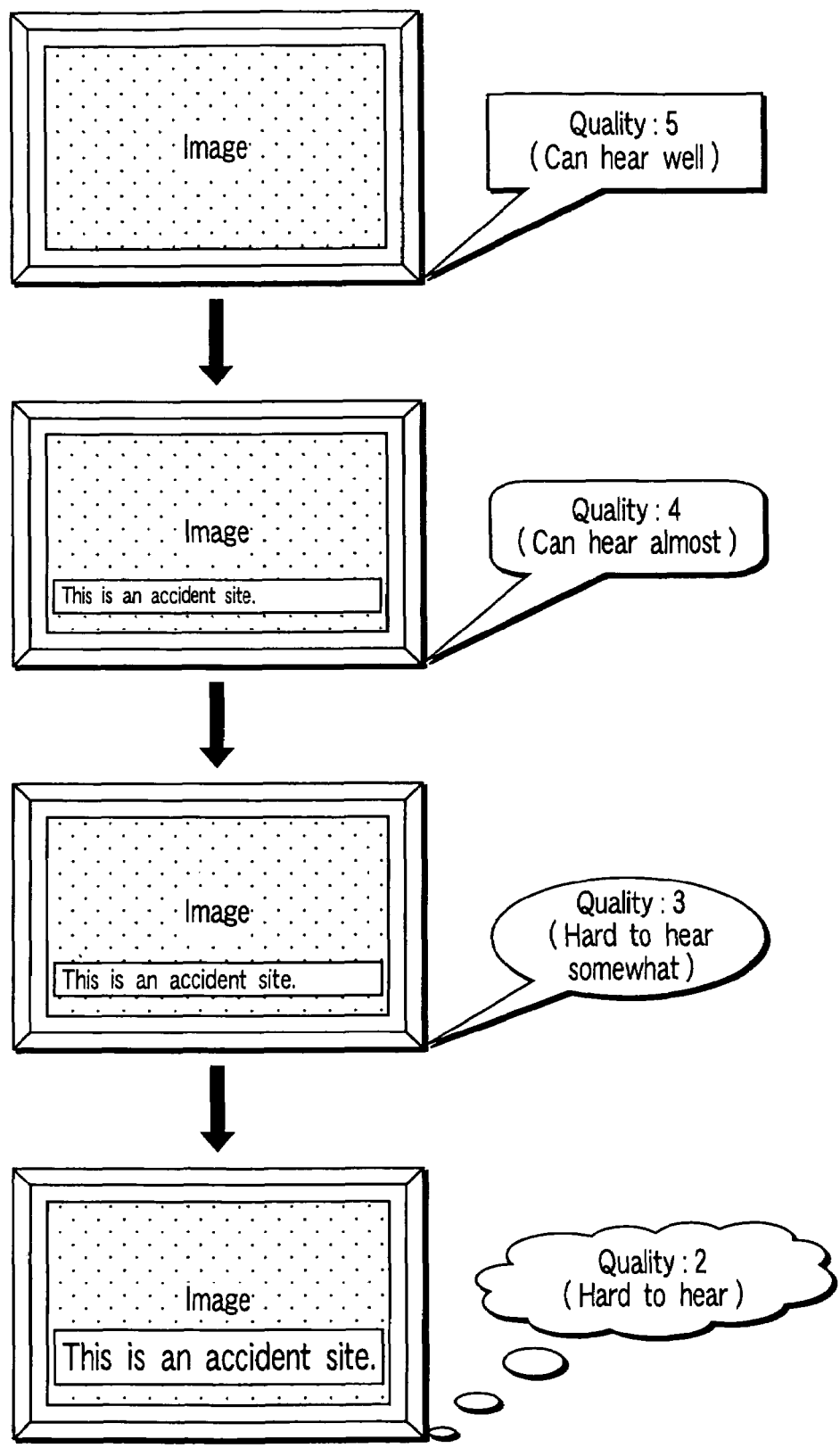
FIG. 4 is a diagram showing another example of controlling a closed caption display in the first embodiment.

Moreover, the respective levels expressing the difficulties in hearing a speech are evaluated by providing stages thereto for each rule constituting the rule set, and for example, as shown in FIG. 4, a mode for displaying closed caption characters may be varied in accordance with a stage of the speech listening level (quality of speech). In this example, when it is evaluated to be most difficult in hearing, the closed caption characters are displayed in a maximum size.

SECOND EMBODIMENT

A closed caption control apparatus according to a second embodiment of the present invention is built into the inside of a video playback apparatus for carrying out playback of video, audio, and closed caption information stored in a storage. As a concrete example of the video playback apparatus, the second embodiment uses, for example, a DVD player. The video playback apparatus such as a DVD player may be substituted for a video record-playback apparatus such as a DVD recorder or a hard disk video recorder.

Figure 5:
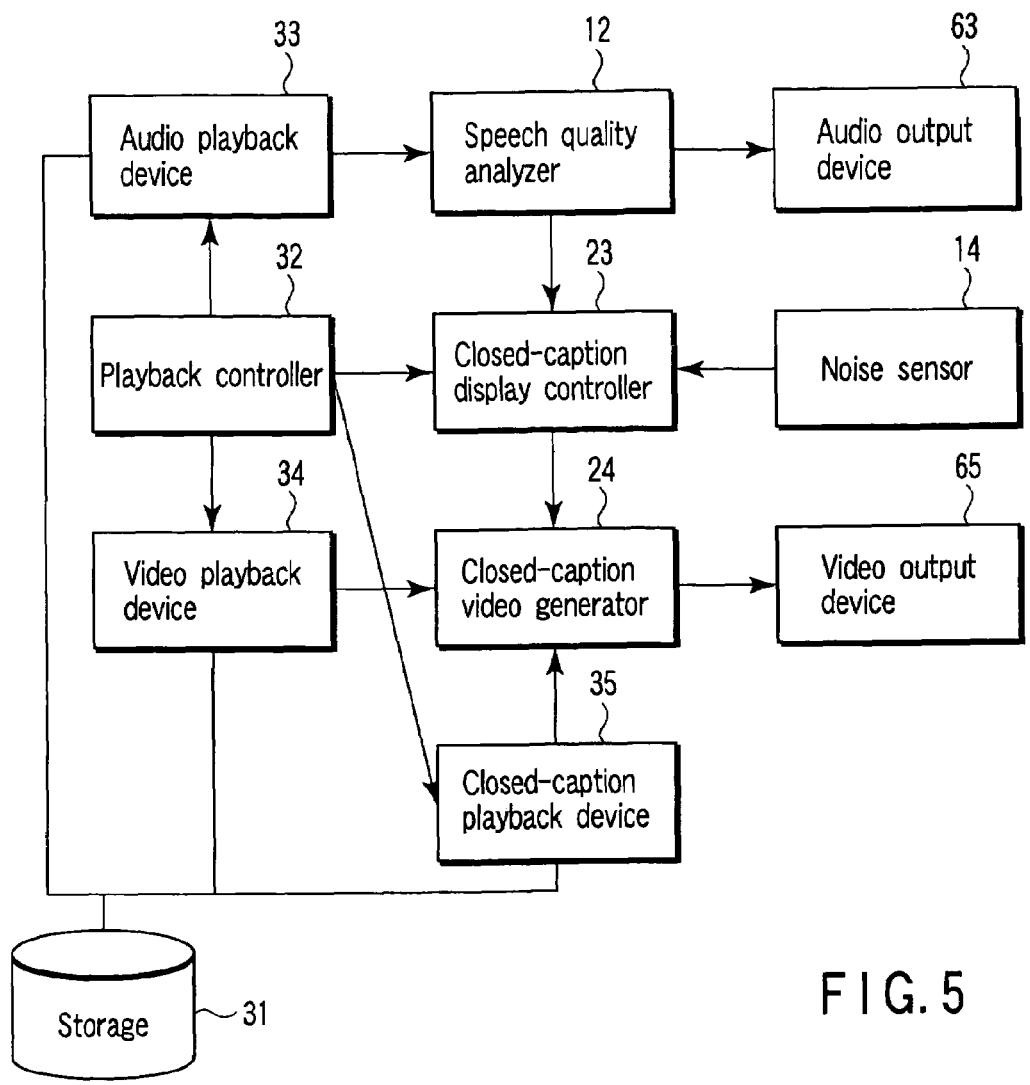
FIG. 5 is a block diagram showing a schematic configuration of a video playback apparatus according to a second embodiment of the present invention.

FIG. 5 is a block diagram showing a schematic configuration of a DVD player in which the closed caption control apparatus according to the second embodiment is built-in. This DVD player includes a driving mechanism (not shown) for carrying out reading of data by mounting a storage 31 on which data of video, audio, and closed caption information are recorded.

Further, there are provided an audio playback device (audio player) 33 for reading and playing-back audio data from the storage 31, a video playback device (video player) 34 for reading and playing-back picture data from the storage 31, a closed caption playback device 35 for reading and playing-back closed caption information from the storage 31, and a playback controller 32 which inputs a playback control signal expressing an instruction provided from a user on the playback of audio data and video data, from an operating panel, a remote control device, or the like, and which controls the playback of the audio data and the video data. The playback control signal expresses playback states such as at least a playback sound volume and a playback speed.

The DVD player of the present embodiment has, as the disclosed components relating to closed caption display control, a speech quality analyzer 12 to analyze audio data played-back by the audio playback device 33, a noise sensor 14 having a microphone, to sense an ambient noise level, a closed caption display controller 23 to control the display of closed caption information in accordance with rules, and a closed-caption video generator 24 having character font data, to receive closed caption information played-back by the closed caption playback device 35 and generating image data of the closed caption characters by using the character font data. The closed-caption video generator 24 generates a closed-caption video signal by synchronizing the image data of the closed caption characters and the video data played-back by the video playback device 34.

Then, the DVD player according to the present embodiment has, as the disclosed components relating to the outputs of closed-caption video and audio, an audio output device 63 to output the audio data input to the speech quality analyzer 12, and a video output device 65 to output the closed-caption video signal generated by the closed-caption video generator 24. A sound device such as, for example, a speaker is connected to the audio output device 63, and a display device to display video is connected to the video output device 65. Note that it may be an integral configuration in which these sound device and display device are in the housing of the DVD player.

The speech quality analyzer 12 carries out an analysis similar to that of the first embodiment. Namely, the speech quality analyzer 12 estimates a level of the background sound mixed in the input audio data and a speed of speech, and outputs those as two analyzed values for use in a speech listening level examination for a speech in the input audio data.

Further, the noise sensor 14 takes-in sound by a microphone provided at an audiovisual environment, and senses an ambient noise level for a viewer, like the first embodiment. The noise sensor 14 may be removed in view of the product cost or the like.

The closed caption display controller 23 has a rule set for use in the speech listening level examination, and carries out the speech listening level examination on a speech in the input audio data by applying the rule set to the analyzed values obtained by the speech quality analyzer 12, the ambient noise level sensed by the noise sensor 14, and a playback state expressed by the playback control signal input to the playback controller 32. On the basis of the result of this examination, the closed caption display controller 23 determines a mode for displaying the closed caption information, and controls the closed-caption video generator 24.

As shown in FIG. 6, in the present embodiment, the rule set is to express the difficulties in hearing a speech by five types of examination reference values including background sound, ambient noise, playback sound volume, speed of speech, and playback speed. The rule set includes Rules 1 to 15. In the examination, it is inspected whether or not the analyzed values obtained by the speech quality analyzer 12, an ambient noise level sensed by the noise sensor 14, and the playback state expressed by the playback control signal input to the playback controller 32 meet at least one of Rules 1 to 15 in comparison with the examination reference values. When those do not meet any of Rules 1 to 15, the difficulty in hearing a speech is denied. In other words, it is not hard to hear the speech, and thus the closed caption control is not carried out. The closed caption is generally in a non-display state.

Rules 1 to 15 included in the rule set are interpreted as follows.

Rule 1: When a level of the background sound mixed in the audio data (including background noise and background musical sound) is not less than a fixed reference value, the closed caption is in a display state.

Rule 2: A reference value variable in accordance with an ambient noise level is determined. When a level of the background sound mixed in the audio data is not less than the variable reference value, the closed caption is in a display state. Rule 2 differs from Rule 1 in that the reference value is not fixed, but variable.

Rule 3: When an ambient noise level is not less than a fixed reference value, the closed caption is in a display state.

Rule 4: When a speed of speech mixed in the audio data is outside a fixed reference range, the closed caption is in a display state.

Rule 5: A reference value variable in accordance with a playback sound volume in a state of playing-back the audio data is determined. When a level of the background sound mixed in the audio data is not less than the variable reference value, the closed caption is in a display state.

Rule 6: A reference value variable in accordance with a playback sound volume and an ambient noise level in a state of playing-back the audio data is determined. When a level of the background sound mixed in the audio data is not less than the variable reference value, the closed caption is in a display state.

Rule 7: A reference value variable in accordance with a level of the background sound in the audio data is determined. When a playback sound volume in a state of playing-back the audio data is less than the variable reference value, the closed caption is in a display state.

Rule 8: A reference value variable in accordance with a level of the background sound in the audio data and an ambient noise level is determined. When a playback sound volume in a state of playing-back the audio data is less than the variable reference value, the closed caption is in a display state.

Rule 9: A reference range variable in accordance with a playback speed in a state of playing-back the audio data is determined. When a speed of speech in the audio data is outside the variable reference range, the closed caption is in a display state.

Rule 10: A reference range variable in accordance with a speed of speech in the audio data is determined. When a playback speed in a state of playing-back the audio data is outside the variable reference range, the closed caption is in a display state.

Rule 11: When a playback speed in a state of playing-back the audio data is outside the variable reference range, the closed caption is in a display state.

Rule 12: When a playback state is reverse, the closed caption is in a display state.

Rule 13: When a playback state is pause, the closed caption is in a display state.

Rule 14: When a playback sound volume is mute, or not more than a fixed reference value, the closed caption is in a display state.

Rule 15: A reference value variable in accordance with an ambient noise level is determined. When a playback sound volume is not more than the variable reference value, the closed caption is in a display state.

In accordance with Rules 1, 2, 5, and 6, when it is hard to hear a speech due to the background sound mixed in the audio data, the closed caption is displayed. In accordance with Rule 3, when it is hard to hear a speech due to the ambient noise, the closed caption is displayed. In accordance with Rules 7, 8, 14, and 15, when it is hard to hear a speech due to the playback sound volume, the closed caption is displayed. In accordance with Rules 4 and 9, when it is hard to hear a speech due to the speed of speech, the closed caption is displayed. In accordance with Rules 10 to 13, when it is hard to hear a speech due to the playback speed, the closed caption is displayed. When Rules 2, 3, 6, 8, and 15 whose examination reference value is an ambient noise are not used, i.e., even when only Rules 1, 4, 5, 7, and 9 to 14 whose examination reference values are the background sound, the playback speed, the speed of speech and the playback speed are used, the effect of the closed caption display control can be obtained. Therefore, the noise sensor 14 may be removed in view of the product cost or the like.

Figure 7:
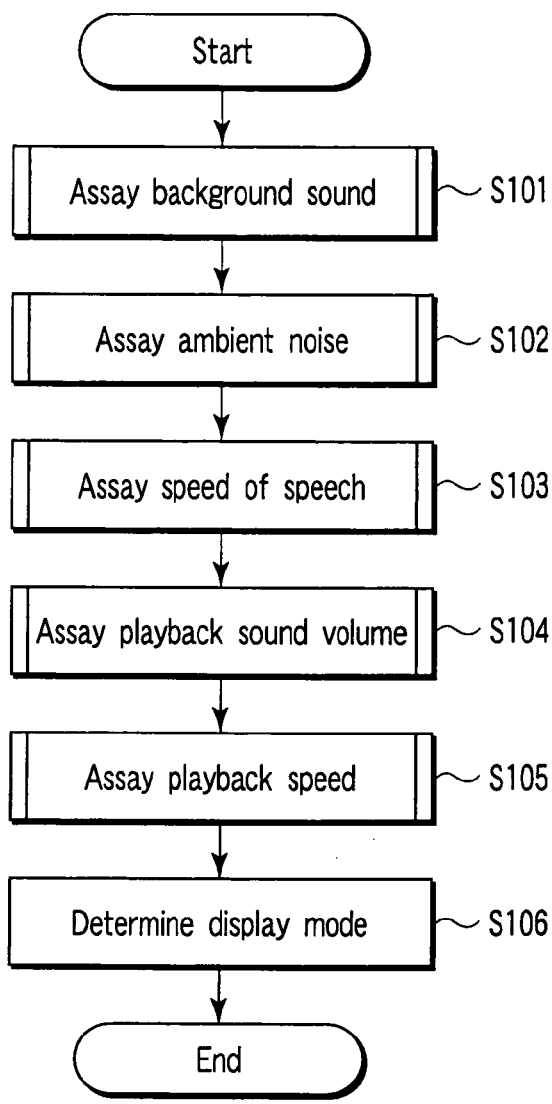
FIG. 7 is a flowchart showing a flow of processing in the closed caption display controller of the second embodiment.

Next, a flow of processing in the closed caption display controller 23 will be described with reference to the flowchart of FIG. 7.

First, an examination is carried out by applying Rules 1, 2, 5 and 6 to the background sound level obtained as an analyzed value by the speech quality analyzer 12 (step S101). Next, an examination is carried out by applying Rule 3 to the ambient noise level sensed by the noise sensor 14 (step S102). Next, an examination is carried out by applying Rules 4 and 9 to the speed of speech obtained as an analyzed value by the speech quality analyzer 12 (step S103). Next, an examination is carried out by applying Rules 7, 8, 14 and 15 to the playback sound volume expressed by the playback control signal from the playback controller 32 (step S104). Next, an examination is carried out by applying Rules 10 to 13 to the playback speed expressed by the playback control signal from the playback controller 32 (step S105). At last, a mode for displaying the closed caption is determined on the basis of the examination results at the respective steps described above, and the closed-caption video generator 24 is controlled (step S106).

Figure 8:
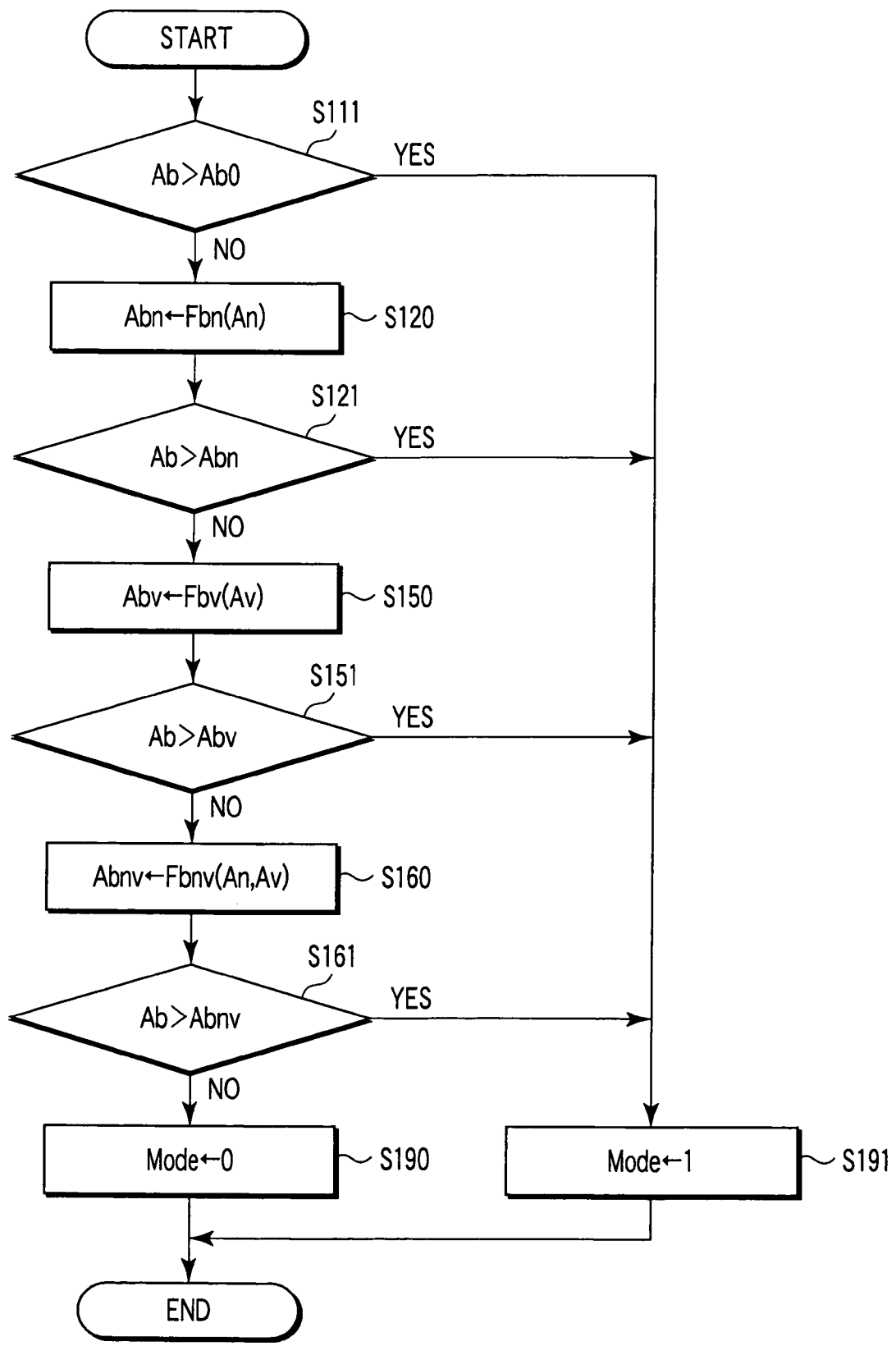
FIG. 8 is a flowchart showing a flow of detailed processing in step S101 of FIG. 7.

Here, a flow of the detailed processing will be described by using the above-described step S101 as one example, with reference to the flowchart of FIG. 8.

First, a level Ab of the background sound mixed in the audio data is compared with a fixed reference value Ab0, which has been set in advance (step S111). When Ab is larger than Ab0, a closed caption operating mode 1 is set in accordance with Rule 1 (step S191). Next, a reference value Fbn (An) variable in accordance with an ambient noise level An is calculated (step S120). This reference value Fbn(An) is compared with the background sound level Ab (step S121). When Ab is larger than Fbn(An), the closed caption operating mode 1 is set in accordance with Rule 2 (step S191). Next, a reference value Fbv(Av) variable in accordance with a playback sound volume Av is calculated (step S150). This reference value Fbv(Av) is compared with the background sound level Ab (step S151). When Ab is larger than Fbv(Av), the closed caption operating mode 1 is set in accordance with Rule 5 (step S191). Next, a reference value Fbnv(An, Av) variable in accordance with the ambient noise level An and the playback sound volume Av is calculated (step S160). This reference value Fbnv(An, Av) is compared with the background sound level Ab (step S161). When Ab is larger than Fbnv(An, Av), the closed caption operating mode 1 is set in accordance with Rule 6 (step S191). At last, when any of conditions is not met, a closed caption operating mode 0 is set (step S190).

THIRD EMBODIMENT

A closed caption control apparatus according to a third embodiment of the present invention is connected to a video playback apparatus for carrying out playback of video, audio, and closed caption information stored in a storage. As a concrete example of the video playback apparatus, the third embodiment uses, for example, a DVD player. The video playback apparatus such as a DVD player may be substituted for a video record-playback apparatus such as a DVD recorder or a hard disk video recorder.

Figure 9:
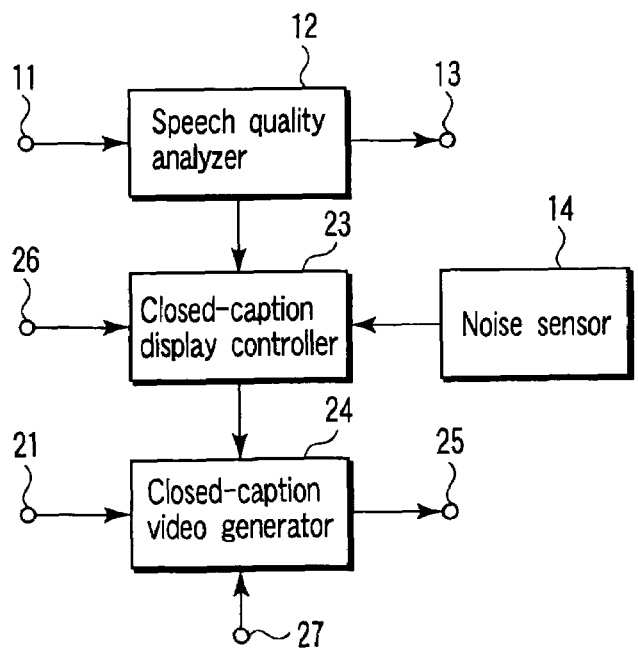
FIG. 9 is a block diagram showing a schematic configuration of a closed caption control apparatus according to a third embodiment of the present invention.

FIG. 9 is a block diagram showing a schematic configuration of the closed caption control apparatus according to the third embodiment is built-in. This apparatus has an audio input terminal 11, a video input terminal 21, a control information input terminal 26, and a character information input terminal 27. These input terminals are respectively connected to an audio output terminal, a video output terminal, a control information output terminal, and a character information output terminal to which the DVD player corresponds via cables or the like. When a playback operation for the DVD player is carried out by a user through an operating panel, a remote control device, or the like, audio data, video data, and data of closed caption information are read and played-back from a storage mounted on the player. The played-back data are input to the audio input terminal 11, the video input terminal 21, and the character information input terminal 27 of the closed caption control apparatus. The control information provided by the user through an operation of an operating panel, a remote control device, or the like at the time of playing-back is input to the control information input terminal 26. This control information expresses various control information, such as a playback sound volume and a playback speed, on the playback, and is not limited to specific information. Further, the control information may be information expressing a playback operation of a user, or may be information expressing an operating state of the DVD player in accordance with a playback operation.

The closed caption control apparatus of the present embodiment has, as the disclosed components relating to the main portion thereof, a speech quality analyzer 12 to analyze audio data inputted to the audio input terminal 11, a noise sensor 14 having a microphone, to sense an ambient noise level, the closed caption display controller 23 to control the display of closed caption information in accordance with rules, and a closed-caption video generator 24 having character font data, to receive closed caption information from the character information input terminal 27 and generate image data of closed caption characters by using the character font data. The closed-caption video generator 24 generates a closed-caption video signal by synchronizing the image data of closed caption characters with video data input from the video input terminal 21.

Then, the closed caption control apparatus of the present embodiment has, as the disclosed components relating to the outputs of closed-caption video and audio, an audio output terminal 13 to output the audio data input to the speech quality analyzer 12, and a video output terminal 25 for outputting the closed caption picture data generated by the closed-caption video generator 24. The audio output terminal 13 is connected to a speaker, and the video output terminal 25 is connected to a display device. The closed caption information input from the character information input terminal 27 may be substituted for the character information embedded in the picture signal for transmitting video data input to the video input terminal 21. The closed-caption video generator 24 extracts the embedded character information and generates the closed-caption video signal.

Figure 18:
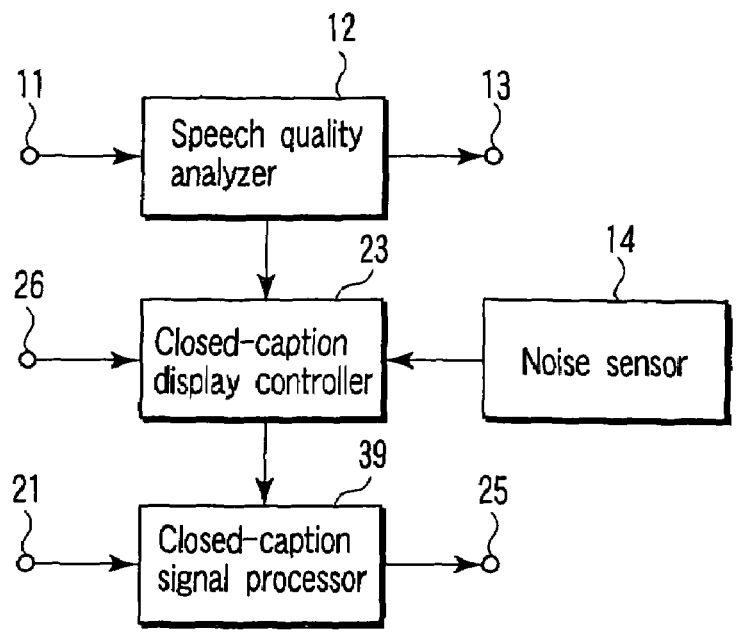
FIG. 18 is a block diagram showing another schematic configuration of the closed caption control apparatus according to the third embodiment of the present invention.

Moreover, the closed caption signal processor 39 may be substituted for the closed-caption video generator 24 and embed the character information on the video signal output from the video output terminal 25. In this case, only whether or not the character information is embedded in the video signal is switched in accordance with control of the closed caption display controller 23. Alternatively, the character information of the closed caption obtained by processing the control information is embedded in the video signal in accordance with control of the closed caption display controller 23. In this case, a display device connected to the video output terminal 25 extracts the character information embedded in the video signal, and generates a closed-caption video signal (FIG. 18).

Figure 19:
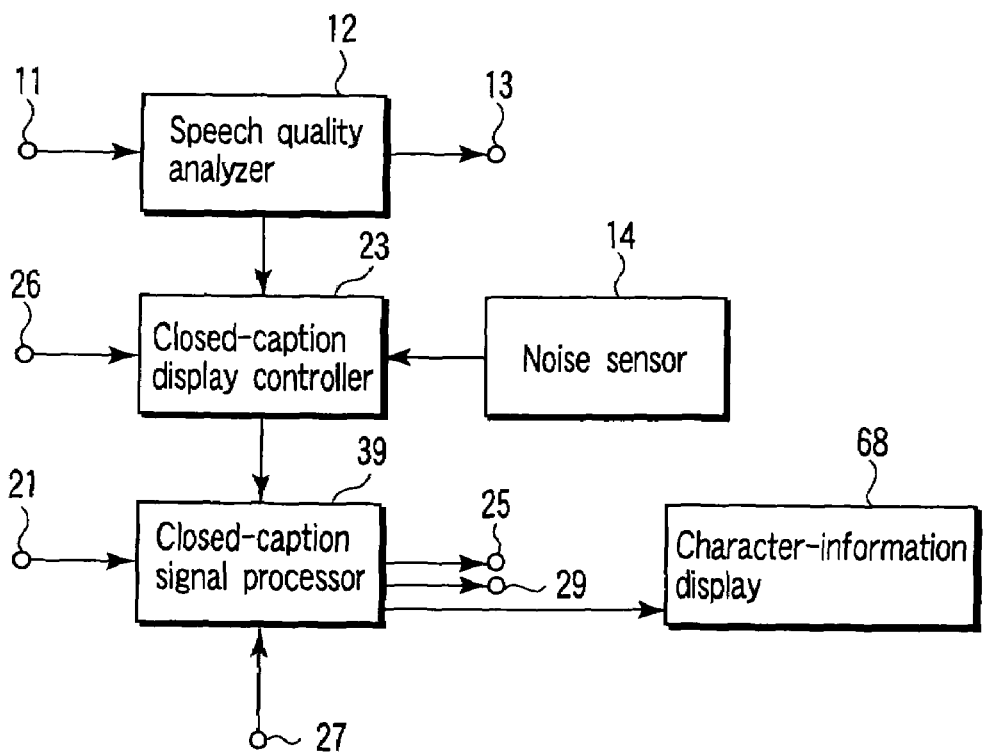
FIG. 19 is a block diagram showing yet another schematic configuration of the closed caption control apparatus according to the third embodiment of the present invention.

Further, the character information may be not input to the video output terminal 25, but the character information output terminal 29 may be additionally provided (FIG. 19).

The above configuration may be selected so as to match the specification of the input/output terminals of an apparatus connected to the closed caption control apparatus of the present embodiment in front and rear stages thereof.

The closed caption control apparatus of the present embodiment may comprise a personal computer (PC).

The speech quality analyzer 12 carries out an analysis similar to that of the first embodiment. Namely, the speech quality analyzer 12 estimates a level of the background sound mixed in the input audio data and a speed of speech, and outputs them as two analyzed values for determining the speech listening level on a speech in the inputted audio data.

Further, the noise sensor 14 takes-in sound by a microphone provided at an audiovisual environment, and senses an ambient noise level for a viewer, like the first embodiment. The noise sensor 14 may be removed in view of the product cost or the like.

The closed caption display controller 23 has the same rule set as that of the second embodiment (refer to FIG. 6), and carries out a speech listening level examination on a speech in the input audio data by applying the rule set to the analyzed values obtained by the speech quality analyzer 12, the ambient noise level sensed by the noise sensor 14, and the playback state expressed by the playback state expressed by the playback control signal input to the control information input terminal 26. On the basis of the result of this examination, the closed caption display controller 23 determines a mode for displaying the closed caption information, and controls the closed-caption video generator 24. In the examination, it is inspected whether or not the analyzed values obtained by the speech quality analyzer 12, the ambient noise level sensed by the noise sensor 14, and the playback state expressed by the playback control signal input to the control information input terminal 26 meet at least one of Rules 1 to 15 in comparison with the examination reference values.

FOURTH EMBODIMENT

A closed caption control apparatus according to a fourth embodiment of the present invention is used by being connected to an audio playback apparatus for carrying out the playback of audio and closed caption information stored in a storage. As a concrete example of the audio playback apparatus, the fourth embodiment uses, for example, an MD (Mini Disc) player. The MD player may be replaced with a CD (Compact Disc) player. Further, the audio playback apparatus may be replaced with an audio record-playback apparatus having a recording function such as an MD recorder or an IC memory recorder.

Figure 10:
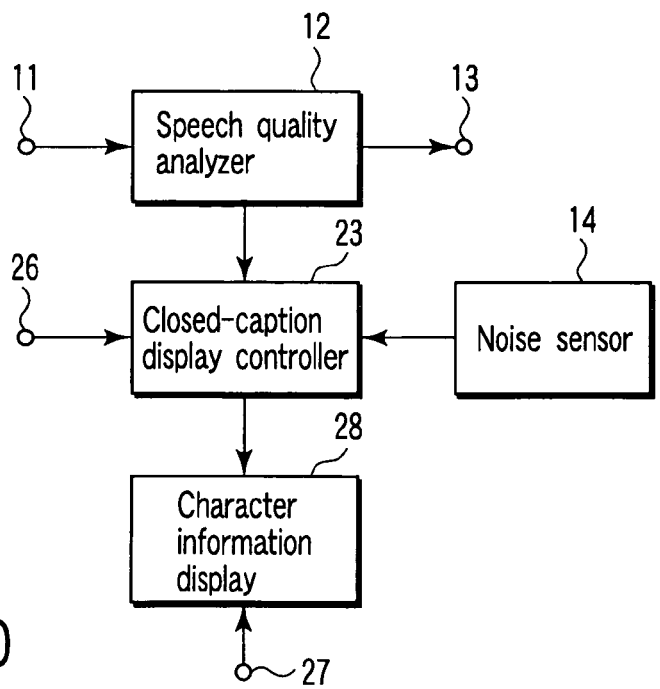
FIG. 10 is a block diagram showing a schematic configuration of a closed caption control apparatus according to a fourth embodiment of the present invention.

FIG. 10 is a block diagram showing a schematic configuration of the closed caption control apparatus according to the fourth embodiment. This apparatus has the audio input terminal 11, the control information input terminal 26, and the character information input terminal 27. The input terminals are respectively connected to the corresponding audio output terminal, control information output terminal, and character information output terminal of the MD player via cables or the like. When playback operation for the MD player is carried out by a user through an operating panel, a remote control device, or the like, audio data and data of closed caption information are read and played back from a storage mounted to the player. The playback data is input to the audio input terminal 11 and the character information input terminal 27 of the closed caption control apparatus. Control information provided by the user through an operation of an operating panel, a remote control device, or the like at the time of playback is input to the control information input terminal 26. This control information expresses various control information relating to playback, such as a playback sound volume and a playback speed, and is not limited to specific information.

The closed caption control apparatus of the present embodiment has, as the disclosed components relating to the main portion thereof, a speech quality analyzer 12 to analyze audio data input to the audio input terminal 11, a noise sensor 14 having a microphone, to sense an ambient noise level, and a closed caption display controller 23 to control the display of closed caption information in accordance with rules.

The closed caption control apparatus of the present embodiment has, as the disclosed components relating to the outputs of audio and closed caption, a character information display device 68 to display the closed caption information input from the character information input terminal 27 under the control of the closed caption display controller 23, and an audio output terminal 13 for outputting the audio data input to the speech quality analyzer 12. The audio output terminal 13 is connected to a speaker or the like. The character information display device 68 is formed from, for example, a liquid crystal display device.

The speech quality analyzer 12 carries out an analysis similar to that of the first embodiment. Namely, the speech quality analyzer 12 estimates a level of the background sound in the input audio data and a speed of speech, and outputs them as two analyzed values for use in a speech listening level examination for a speech in the inputted audio data. Further, the noise sensor 14 takes-in sound by a microphone provided at an audiovisual environment, and senses an ambient noise level for a viewer, like the first embodiment. The noise sensor 14 may be removed in view of the product cost or the like.

The closed caption display controller 23 has the same rule set as that of the second embodiment (refer to FIG. 6), and carries out the speech listening level examination on a speech in the input audio data by applying the rule set to the analyzed values obtained by the speech quality analyzer 12, the ambient noise level sensed by the noise sensor 14, and the playback state expressed by the playback control signal input to the control information input terminal 26. On the basis of the result of this examination, the closed caption display controller 23 determines a mode for displaying the closed caption information, and controls the character information display device 68. In the examination, it is inspected whether or not the analyzed values obtained by the speech quality analyzer 12, the ambient noise level sensed by the noise sensor 14, and the playback state expressed by the playback control signal input to the control information input terminal 26 meet at least one of Rules 1 to 15 in comparison with the examination reference values. In addition, the closed caption control apparatus of the present embodiment may be connected to an audio playback apparatus which receives and plays-back broadcasted audio and closed caption information. As a concrete example of the audio playback apparatus, for example, a radio broadcasting receiver is used. In this case, the control information input terminal 26 may be excluded.

FIFTH EMBODIMENT

A closed caption control apparatus according to a fifth embodiment of the present invention is built into the inside of a contents player which receives and plays-back video contents including broadcasted video, audio, and closed caption information.

FIG. 11 is a block diagram showing a schematic configuration of a contents player in which the closed caption control apparatus according to the fifth embodiment is built-in. This contents player may comprise, for example, a personal computer (PC), which includes a contents receiver 41 for receiving video contents transmitted via a computer network or the like, an audio playback device 43 for separating audio data from the contents received by the contents receiver 41 and playing back it, a video playback device 44 for separating video data from the contents received by the contents receiver 41 and playing back it, a playback controller 42 for controlling the play-back of the audio data and the video data by inputting a signal expressing an instruction on the playback of audio data and video data, provided by a user from an operating panel, a remote control device, or the like, and a closed caption playback device 45 for separating closed caption information from the contents received by the contents receiver 41 and playing back it.

Further, the contents player of the present embodiment has, as the disclosed components relating to the closed caption display control, a speech quality analyzer 12 for analyzing audio data played-back by the audio playback device 43, a noise sensor 14 having a microphone, for sensing an ambient noise level, a closed caption display controller 23 for controlling the display of closed caption information in accordance with rules, and a closed-caption video generator 24 having character font data, for receiving the closed caption information played-back by the closed caption playback device 45 and generating picture data of the closed caption characters by using the character font data, and for generating a closed-caption video signal by synchronizing the image data of the closed caption characters with video data played back by the video playback device 44.

The contents player of the present embodiment has, as the disclosed components relating to the outputs of closed-caption video and audio, an audio output device 63 which includes, for example, a speaker, and which outputs the speech based on the audio data input to the speech quality analyzer 12, and a video output device 65 which includes, for example, a display device, and which outputs the image based on the closed-caption picture data generated by the closed-caption video generator 24.

The speech quality analyzer 12 carries out an analysis similar to that of the first embodiment. Namely, the speech quality analyzer 12 estimates a level of the background sound mixed in the input audio data and a speed of speech, and outputs them as two analyzed values for use in a speech listening level examination for a speech in the input audio data. Further, the noise sensor 14 takes-in sound by a microphone provided at an audiovisual environment, and senses an ambient noise level for a viewer, like the first embodiment. The noise sensor 14 may be removed in view of the product cost or the like.

The closed caption display controller 23 has the same rule set as that of the second embodiment (refer to FIG. 6), and carries out the speech listening level examination on a speech in the input audio data by applying the rule set to the analyzed values obtained by the speech quality analyzer 12, the ambient noise level sensed by the noise sensor 14, and the playback state expressed by the playback control signal inputted from the playback controller 42. On the basis of the result of this examination, the closed caption display controller 23 determines a mode for displaying the closed caption information, and controls the closed-caption video generator 24. In the examination, it is inspected whether or not the analyzed values obtained by the speech quality analyzer 12, the ambient noise level sensed by the noise sensor 14, and the playback state expressed by the playback control signal from the playback controller 42 meet at least one of Rules 1 to 15 in comparison with the examination reference values.

SIXTH EMBODIMENT

A closed caption control apparatus according to a sixth embodiment of the present invention is built into the inside of a video playback apparatus which receives and plays-back broadcasted video, audio, and closed caption information. As a concrete example of the video playback apparatus, the sixth embodiment uses, for example, a television receiver. Closed caption information is transmitted by being embedded in a video signal, or is transmitted as sub-video and received by the television receiver.

FIG. 12 is a block diagram showing a schematic configuration of a television receiver in which the closed caption control apparatus according to the sixth embodiment is built-in. This television receiver has a broadcast receiver 51 to receive a broadcasting signal transmitted via radio wave, cables, or the like, an audio demodulator 53 to demodulate a speech signal from the broadcasting signal received by the broadcast receiver 51, a video demodulator 54 to demodulate a picture signal from the broadcasting signal received by the broadcast receiver 51, and a closed caption demodulator 55 to demodulate closed caption information from the broadcasting signal received by the broadcast receiver 51.

The television receiver of the present embodiment has, as the disclosed components relating to the closed caption display control, a speech quality analyzer 12 to analyze the speech signal demodulated by the audio demodulator 53, a noise sensor 14 having a microphone, to sense an ambient noise level, a closed caption display controller 23 to control the display of closed caption information in accordance with rules, and a closed-caption video generator 24 having character font data, to receive the closed caption information demodulated by the closed caption demodulator 55 and generate image data of the closed caption characters by using the character font data. The closed-caption video generator 24 generates a closed-caption video signal by synchronizing the image data of the closed caption characters with the video data demodulated by the video demodulator 54.

The television receiver of the present embodiment has, as the disclosed components relating to the outputs of audio and video, an audio output device 63 includes, for example, a speaker, and which outputs a speech based on the speech signal inputted to the speech quality analyzer 12. Further, there is provided the video output device 65 which includes, for example, a liquid crystal or CRT type display device, and which outputs video based on the closed-caption picture signal generated by the closed-caption video generator 24.

The speech quality analyzer 12 carries out an analysis similar to that of the first embodiment. Namely, the speech quality analyzer 12 estimates a level of the background sound in the input speech signal and a speed of speech, and outputs them as two analyzed values for use in a speech listening level examination for a speech in the input speech signal. Further, the noise sensor 14 takes-in sound by a microphone provided at an audiovisual environment, and senses an ambient noise level for a viewer, like the first embodiment. The noise sensor 14 may be removed in view of the product cost or the like.

The closed caption display controller 23 has the same rule set as that of the first embodiment (refer to FIG. 2), and carries out a speech listening level examination on a speech in the inputted speech signal by applying the rule set to the analyzed values obtained by the speech quality analyzer 12 and the ambient noise level sensed by the noise sensor 14. On the basis of the result of this examination, the closed caption display controller 23 determines a mode for displaying the closed caption information, and controls the closed-caption video generator 24. In the examination, it is inspected whether or not the analyzed values obtained by the speech quality analyzer 12, and the ambient noise level sensed by the noise sensor 14 meet at least one of Rules 1 to 4 in comparison with the examination reference values.

SEVENTH EMBODIMENT

A closed caption control apparatus according to a seventh embodiment of the present invention is built into an audio playback apparatus for carrying out playback of audio and closed caption information stored in a storage. As a concrete example of the audio playback apparatus, the seventh embodiment uses, for example, an MD (Mini Disc) player. The MD player may be replaced with a CD (Compact Disc) player. Further, the audio playback apparatus may be replaced with an audio record-playback apparatus having a recording function, such as an MD recorder or an IC memory recorder.

Figure 13:
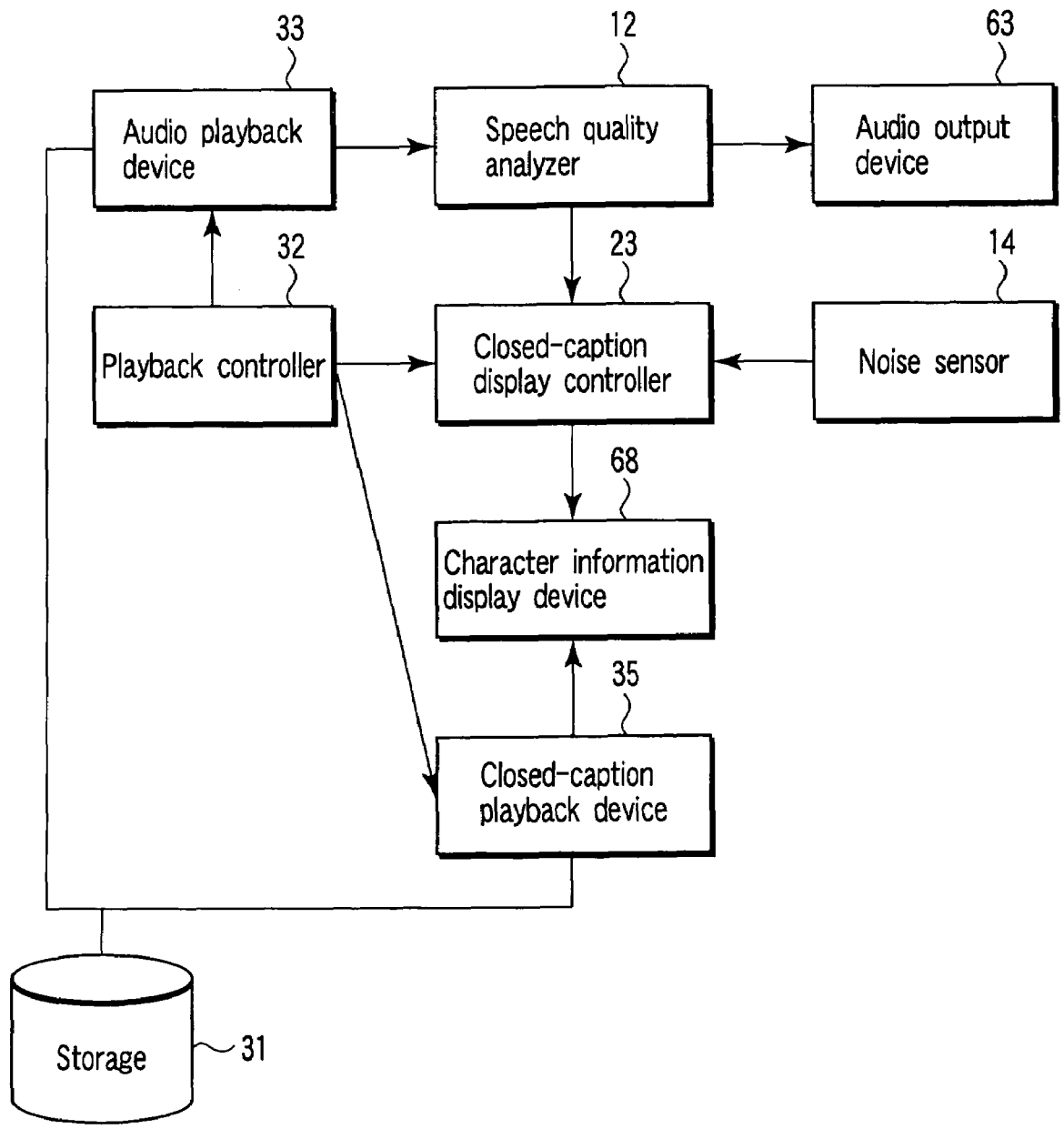
FIG. 13 is a block diagram showing a schematic configuration of an audio playback apparatus according to a seventh embodiment of the present invention.

FIG. 13 is a block diagram showing a schematic configuration of an MD player in which the closed caption control apparatus according to the seventh embodiment is built-in. This MD player has a driving mechanism (not shown) for carrying out reading of data by mounting the storage 31 on which data of audio and closed caption information are recorded.

Further, there are provided an audio playback device 33 which reads and plays-back audio data from the storage 31, a closed caption playback device 35 which reads and playing-back character image data from the storage 31, and a playback controller 32 which inputs a playback control signal expressing an instruction on the playback of audio data, provided by a user via an operating panel, a remote control device, or the like, and which controls the playback of the audio data. The playback control signal expresses playback states such as at least a playback sound volume or a playback speed.

The MD player of the present embodiment has, as the disclosed components relating to the closed caption display control, a speech quality analyzer 12 to analyze audio data played-back by the audio playback device 33, a noise sensor 14 having a microphone, to sense an ambient noise level, a closed caption display controller 23 to control the display of closed caption information in accordance with rules.

Then, the MD player of the present embodiment has, as the disclosed components relating to the outputs of audio and closed caption, a character information display device 68 for displaying the closed caption information played-back by the closed caption playback device 35 under the control of the closed caption display controller 23, and an audio output device 63 for outputting the audio data input to the speech quality analyzer 12. The character information display device 68 is formed from, for example, a liquid crystal display device. A sound device such as, for example, a speaker is connected to the audio output device 63. The audio device may be provided integrally in the housing of the MD player.

EIGHTH EMBODIMENT

A closed caption control apparatus according to an eighth embodiment of the present invention is built into the inside of a contents player which receives and plays-back audio contents including broadcasted audio and closed caption information.

FIG. 14 is a block diagram showing a schematic configuration of a contents player in which the closed caption control apparatus according to the eighth embodiment is built-in. This contents player may comprise, for example, a personal computer (PC), which includes a contents receiver 41 for receiving audio contents transmitted via a computer network or the like, an audio playback device 43 for separating audio data from the contents received by the contents receiver 41 and playing back it, a playback controller 42 for controlling the playback of the audio data by inputting a signal expressing an instruction on the playback of the audio data provided by a user via an operating panel, a remote control device, or the like, and a closed caption playback device 45 for separating closed caption information from the contents received by the contents receiver 41 and playing back it.

The contents player of the present embodiment has, as the disclosed components relating to the closed caption display control, a speech quality analyzer 12 for analyzing audio data played back by the audio playback device 43, a noise sensor 14 having a microphone, for sensing an ambient noise level, and a closed caption display controller 23 for controlling the display of closed caption information in accordance with rules.

The contents player of the present embodiment has, as the disclosed components relating to the outputs of audio and closed caption, a character information display device 68 for displaying the closed caption information played back by the closed caption playback device 45 under the control of the closed caption display controller 23, and an audio output device 63 for outputting the audio data inputted to the speech quality analyzer 12. The character information display device 68 comprises, for example, a liquid crystal display device. A sound device such as, for example, a speaker is connected to the audio output device 63. The sound device may be provided integrally in the housing of the contents player.

NINTH EMBODIMENT

A closed caption control apparatus according to a ninth embodiment of the present invention is built into the inside of an audio playback apparatus which receives and plays-back broadcasted audio and closed caption information. As a concrete example of the audio playback apparatus, the ninth embodiment uses, for example, a radio broadcasting receiver corresponding to FM character-multiplex broadcasting. Closed caption information is transmitted along with the speech signal by being embedded in FM broadcasting radio wave band. The radio receiver may be replaced with a terrestrial digital audio broadcasting receiver. The closed caption information is transmitted as data broadcasting.

FIG. 15 is a block diagram showing a schematic configuration of a radio broadcasting receiver in which the closed caption control apparatus according to the ninth embodiment is built-in. This radio broadcasting receiver has a broadcast receiver 51 to receive a broadcasting signal transmitted via radio wave, cables, or the like, an audio demodulator 53 to demodulate a speech signal from the broadcasting signal received by the broadcast receiver 51, and a closed caption demodulator 55 to demodulate closed caption information from the broadcasting signal received by the broadcast receiver 51.

The radio broadcasting receiver of the present embodiment has, as the disclosed components relating to the closed caption display control, a speech quality analyzer 12 to analyze the speech signal demodulated by the audio demodulator 53, a noise sensor 14 having a microphone, to sense an ambient noise level, and a closed caption display controller 23 to control the display of closed caption information in accordance with rules.

The radio broadcasting receiver of the present embodiment has, as the disclosed components relating to the outputs of audio and closed caption, a character information display device 68 to display the closed caption information demodulated by the closed caption demodulator 55 under the control of the closed caption display controller 23, and an audio output device 63 to output the speech signal input to the speech quality analyzer 12. The character information display device 68 comprises, for example, a liquid crystal display device. A sound device such as, for example, a speaker is connected to the audio output device 63. The sound device may be provided integrally in the housing of the radio broadcasting receiver.

As described above, in accordance with the present invention, a closed caption control apparatus in which, even in a situation that when it is hard to hear a speech in audio output, complementary closed caption information is displayed in order to appropriately and exactly deliver audio contents to a viewer, or a mode for displaying the closed caption information is controlled, and a method therefor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A closed caption display controller to control a display mode of a closed caption corresponding to a speech of an audio signal obtained by mixing the speech and a background sound or background music, the controller comprising:
   an analysis unit configured to analyze the audio signal to obtain a plurality of analysis values including a background level about the background sound or the background music;
   an examination unit configured to examine a difficulty in listening to the speech by comparing the plurality of analysis values with a plurality of reference values including at least a reference value of the background level; and
   a determination unit configured to determine a display mode of the closed caption image according to an examination result of the examination unit.

2. The closed caption display controller according to claim 1, which further includes a noise sensor to sense an ambient noise level, and the examination unit is configured to examine a reference value of the ambient noise level capable of determining whether the speech is hard to be listened.

3. The closed caption display controller according to claim 1, which further includes a control signal input unit to input a playback control signal representing a playback sound volume of the speech or a playback speed thereof, and the examination unit is configured to examine one of a reference value of the playback sound volume and a reference value of the playback speed which are capable of determining whether the speech is difficult to be listened.

4. The closed caption display controller according to claim 1, wherein the examination unit is configured to examine a range of a reference value of a speed of the speech capable of determining whether the speech is hard to be listened.

5. The closed caption display controller according to claim 1, wherein the determination unit including means for switching the display mode from a non-display of the closed caption to a display thereof, when the examination unit determines a speech listening level that is hard to listen.

6. The closed caption display controller according to claim 1, wherein the determination unit is configured to enlarge a size of the closed caption, when the examination unit determines a speech listening level that is hard to listen.

7. The closed caption display controller according to claim 1, wherein the determination unit includes means for increasing the number of character rows of the closed caption, when the examination unit determines a speech listening level that is hard to listen.

8. A closed caption display control method of controlling a display mode of a closed caption corresponding to a speech of an audio signal obtained by mixing the speech and a background sound or background music, the method comprising:

analyzing the speech signal to obtain a plurality of analysis values including a background level about the background sound or the background music;

examining a difficulty in listening to the speech by comparing the plurality of analysis values with a plurality of reference values including at least a reference value of the background level and determining a display mode according to an examination result.

9. A computer readable medium encoded with a computer program for controlling a display mode of a closed caption corresponding to a speech of an audio signal obtained by mixing the speech and a background sound or background music, the program including computer instructions which when executed by a computer results in performance of steps comprising:

analyzing the speech signal to obtain a plurality of analysis values including a background level about the background sound or the background music, examining a difficulty in listening to the speech by comparing the plurality of analysis values with a plurality of reference values including at least a reference value of the background level, and determining a display mode according to an examination result of the examination unit.

\* \* \* \* \*